United States Patent
Crandall

[19]
[11] Patent Number: 6,159,537
[45] Date of Patent: *Dec. 12, 2000

[54] METHOD OF MAKING A RETROREFLECTIVE ARTICLE THAT HAS A BINDER LAYER CONTAINING AN EPOXY RESIN AND SILICONE CROSSLINKED POLYMER

[75] Inventor: Michael D. Crandall, North Oaks, Minn.

[73] Assignee: 3M Innovative Properties Company, St. Paul, Minn.

[*] Notice: This patent issued on a continued prosecution application filed under 37 CFR 1.53(d), and is subject to the twenty year patent term provisions of 35 U.S.C. 154(a)(2).

[21] Appl. No.: 08/904,600

[22] Filed: Aug. 1, 1997

[51] Int. Cl.[7] .................................................. B05D 5/06
[52] U.S. Cl. ..................... 427/163.4; 427/204; 427/387
[58] Field of Search ................................ 427/163.4, 387, 427/136, 137, 203, 204; 359/528, 540; 428/143

[56] References Cited

U.S. PATENT DOCUMENTS

| | | |
|---|---|---|
| 3,758,192 | 9/1973 | Bingham ................................ 350/105 |
| 4,562,237 | 12/1985 | Okuno et al. . |
| 5,200,262 | 4/1993 | Li . |
| 5,474,827 | 12/1995 | Crandall et al. . |
| 5,976,669 | 11/1999 | Fleming . |
| 6,066,384 | 5/2000 | Crandall . |

FOREIGN PATENT DOCUMENTS

| | | |
|---|---|---|
| 370 464 | 5/1990 | European Pat. Off. . |
| 1-108254 | 4/1989 | Japan . |

*Primary Examiner*—Fred J. Parker
*Attorney, Agent, or Firm*—Karl G. Hanson

[57] ABSTRACT

A method of making a retroreflective article, includes applying a pre-binder composition onto a retroreflective layer where the pre-binder composition comprises about 5 to about 40 parts of an epoxy resin and about 60 to about 95 parts of an alkoxysilane terminated polymer and then curing the pre-binder composition to form a binder layer that is adhered to the retroreflective layer. The method is useful for providing retroreflective displays onto an article of clothing.

8 Claims, 2 Drawing Sheets

METHOD OF MAKING A RETROREFLECTIVE ARTICLE THAT HAS A BINDER LAYER CONTAINING AN EPOXY RESIN AND SILICONE CROSSLINKED POLYMER

TECHNICAL FIELD

This invention pertains to a retroreflective article that has a binder layer made from an epoxy resin and a silicon-containing, crosslinkable, terminal functional group polymer. In cured form, the binder layer contains a first domain that includes a cured epoxy resin and a second domain that includes a polymer that is crosslinked through silicone linkages. The invention also pertains to an article of clothing that displays such a retroreflective article.

BACKGROUND

Retroreflective articles have the ability to return incident light—that otherwise would be reflected elsewhere—back towards the light source. This unique ability has led to widespread use of retroreflective articles on clothing. Persons who work or exercise near motor vehicle traffic need to be conspicuously visible, particularly at nighttime, so that they do not get struck by passing motor vehicles. Retroreflective articles serve the purpose of highlighting a person's presence by retroreflecting light from motor vehicle headlamps or other light sources.

A retroreflective article typically comprises a layer of optical elements, a reflective layer, and a polymeric binder layer. The optical elements usually are transparent microspheres that are partially embedded in the polymeric binder layer such that a substantial portion of each microsphere protrudes from the polymeric binder layer. The reflective layer is disposed beneath the embedded portion of the transparent microspheres. Light striking the front surface of the retroreflective articles passes through the transparent microspheres, is reflected by the reflective layer, and is collimated by the transparent microspheres to travel back in the direction of the light source. layer, and is collimated by the transparent microspheres to travel back in the direction of the light source.

Retroreflective articles that are used on clothing, particularly shoes, may be subjected to high levels of abrasion, as might be produced, for example, by bombardment of sand, gravel, or other debris, or by rubbing against concrete or other abrasive surfaces. Retroreflective articles used in such environments therefore should demonstrate good abrasion resistance.

Retroreflective articles applied onto clothing that is normally laundered must also be able to withstand laundering conditions. If the retroreflective article is not durable to laundering, and retroreflectivity becomes substantially diminished after repeated washings, the clothing cannot continue to serve its safety function by highlighting the wearer's presence. Investigators in the retroreflective art have pursued an ongoing goal of developing launderably durable retroreflective articles so that persons wearing retroreflective clothing can continue to be conspicuously visible after the clothing has been worn and cleaned many times. On the other hand, some articles of clothing, such as shoes, are not routinely laundered. For articles of this type, launderability is a less stringent requirement, and some launderability may be sacrificed in favor of increased abrasion resistance.

In a successful attempt at developing an exposed lens retroreflective article that is durable under industrial laundering conditions. Wu Shyong Li in U.S. Pat. 5,200,262 partially embedded a monolayer of metal-coated microspheres in a binder layer that contained a flexible polymer and one or more isocyanate-functional silane coupling agents. The flexible polymers include isocyanate curable polyesters and one or two component polyurethanes.

In another successful attempt, Li used a binder layer that was formed from an electron-beam curable polymer and typically one or more crosslinkers and silane coupling agents (see U.S. Pat. No. 5,283,101). The electron-beam curable polymers included chlorosulfonated polyethylenes, ethylene copolymers comprising at least about 70 weight percent of polyethylene such as ethylene/vinyl acetate, ethylene/acrylate and ethylene/acrylic acid, and poly (ethylene-co-propyulene-co-diene) polymers. The microspheres were embedded in the cured binder layer, and a specular reflective metal layer was disposed on the microsphere's embedded portions.

In another approach, Michael Crandall et al. disclosed making a retroreflective article launderably-durable by placing a compound that contains an aromatic bidentate moiety in chemical association with the reflective metal layer. In one embodiment, the compound is disposed in a polymeric binder layer that preferably includes a crosslinked or virtually crosslinked elastomer. Crosslinked polymers include polyolefins, polyesters, polyurethanes, polyepoxides, and natural or synthetic rubbers. This product is disclosed in U.S. Pat. No. 5,474,827.

In U.S. Pat. No. 5,645,938, Michael Crandall made a further contribution to the art by producing a launderably durable retroreflective article that included a binder layer that comprised a polyester polyurethane polymer. The polyurethane polymer is a reaction product of (i) a polyester polyol that contains an aromatic nucleus and that has at least two isocyanate groups bonded non-conjugatively to the aromatic nucleus, and (ii) a polyisocyanate.

Several references have discussed adhesives that are made from silicon-containing polymers and epoxy resins. European Patent Application 0 370 464 A2 to Kanegafuchi Chemical Industry discloses a curable resin composition comprising specified amounts of an organic rubbery polymer having a crosslinkable group —$Si(R^1)(OR^2)_2$, an epoxy resin, a silanol condensation catalyst, a curing agent, and a silicon compound such as aminopropylmethyldiethoxysilane. U.S. Pat. No. 4,562,237 to Okuno discloses a curable sealant comprising a polyether polymer that has a terminal silicone functional group, the condensation product of an aminoalkylalkoxysilane with an epoxy compound and an alkoxy silane and an organic titanic acid ester, and a condensation catalyst or a silanol compound. Product literature from Union Carbide entitled SILMOD™ Polyethers discloses curable adhesives comprising a silicon-modified polyethers and an epoxy resin with a 2:1 ratio for the best balance of properties. The above references disclose using adhesives in applications requiring hardness and strength such as for sealants and in building applications. These hard and strong adhesives are rigid. For example, the Silmod™ product literature teaches an adhesive with the best balance of properties having an elongation of 370 percent. None of the documents discuss using epoxy resin and a polymer that has silicone-containing, crosslinkable, terminal, functional group in a retroreflective article.

SUMMARY OF THE INVENTION

The present invention provides a retroreflective article that comprises retroreflective elements disposed on a binder layer that is made from components comprising an epoxy resin and a polymer that has a silicon-containing, crosslinkable, terminal, functional group. When in use, the binder layer contains a cured epoxy domain and a domain that includes polymers crosslinked through silicone linkages.

The present invention also provides an article of clothing that displays the inventive retroreflective article. The article of clothing may include an article of wearing apparel sized and configured to be worn or carried by a person. The binder layer can be attached directly to an article of wearing apparel, or it may be adhered to a substrate. The substrate may be, for example, a web of leather, plastic, mesh, a netting, a foam, a woven, knitted or non-woven material. The binder layer can be attached to the substrate by an adhesive bond, by sewing, by riveting, or by any other suitable technique. The substrate can be attached to clothing by the same techniques.

Retroreflective articles of the invention have been found to exhibit good retention of retroreflective brightness after being subjected to abrasion and repeated laundering. These advantageous results stem from the composition of the binder layer. The inventive articles may be subjected to a good degree of abrasion and laundering while still retaining the desired retroreflective character.

The above and other advantages of the invention are more fully shown and described in the drawings and detailed description of this invention, where similar reference numerals are used to represent similar parts. It is to be understood, however, that the description and drawings are for the purposes of illustration and should not be read in a manner that would unduly limit the scope of this invention.

DETAILED DESCRIPTION OF THE INVENTION

In describing preferred embodiments of the invention, specific terminology is used for the sake of clarity. The invention, however, is not intended to be limited to the specific terms so selected, and it is to be understood that each term so selected includes all technical equivalents that operate similarly. The term "parts" means parts by weight. Certain nonlimiting aspects of the present invention are illustrated in FIGS. 1–4.

Figure 1:
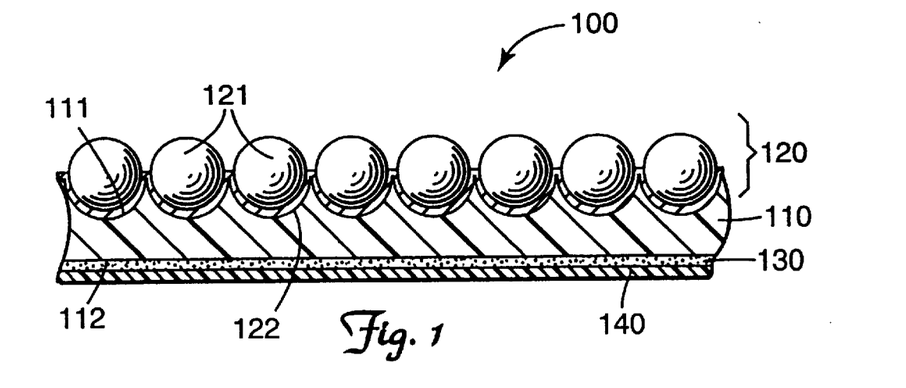
FIG. 1 is a cross-sectional view of a retroreflective article 100 in accordance with an embodiment of the present invention.

FIG. 1 shows retroreflective article 100 that has a binder layer 110 and a retroreflective layer 120. A specularly reflective layer 122 is disposed on a first major surface 111 of the binder layer 110. Retroreflective layer 120, including structures such as microspheres 121, is disposed over the binder layer 110. Disposed on a second major surface 112 of the binder layer 110 is an optional adhesive layer 130, such as a pressure sensitive or hot melt adhesive, and an optional release liner 140 that covers the adhesive layer's exposed surface.

Figure 2:
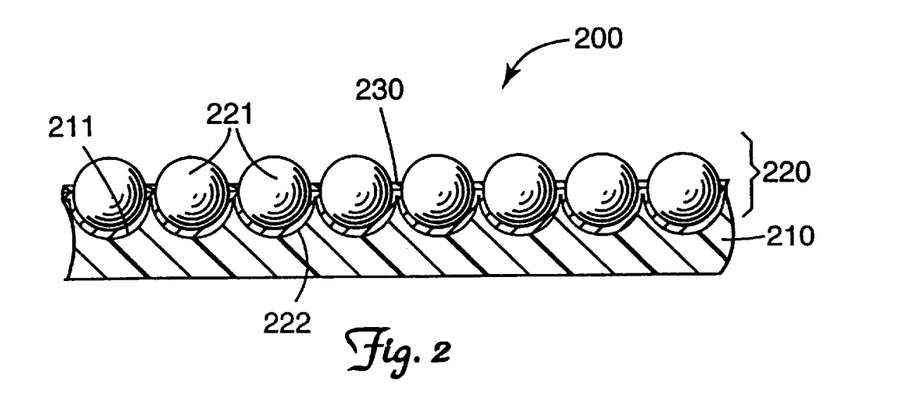
FIG. 2 is a cross-sectional view of a retroreflective article 200 in accordance with another embodiment of the present invention.

FIG. 2 shows retroreflective article 200 of the invention in which a coating 230 is disposed over the specularly reflecting layer 222. Article 200 includes binder layer 210, a layer 220 of partially embedded retroreflective elements with microspheres 221 and specularly reflective layer 222. Coating 230 preferably comprises a metal protectant as described in U.S. Pat. No. 5,474,827.

Figure 3:
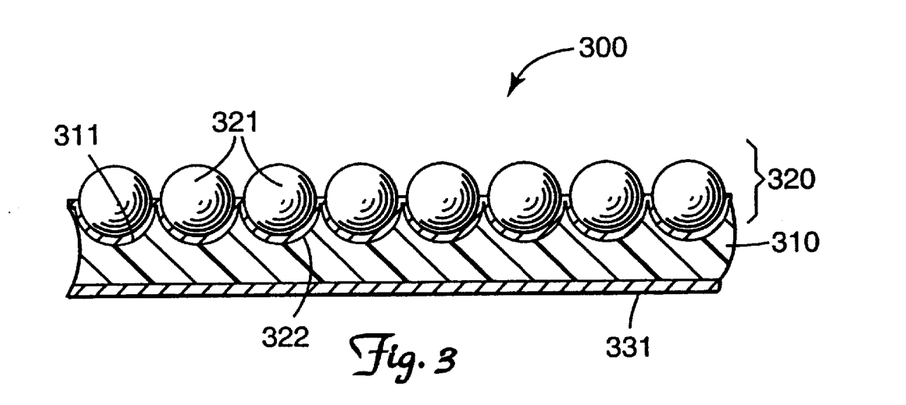
FIG. 3 is a cross-sectional view of a retroreflective article 300 in accordance with a another embodiment of the invention.

FIG. 3 shows retroreflective article 300 having binder layer 310. A specularly reflective layer 322 is disposed on a first major surface 311 of binder layer 310. Retroreflective element layer 320 includes structures such as microspheres 321 supported by the binder layer. Disposed on a second major surface 312 of binder layer 310 is a fabric layer 331, which can be laminated to binder layer 310 after partially curing it, so that complete adhesion occurs after completion of the cure of binder layer 310. The fabric layer can be part of a clothing layer or retroreflective article 300 can be sewn, through fabric layer 331, to a textile or other sewable material.

Figure 4:
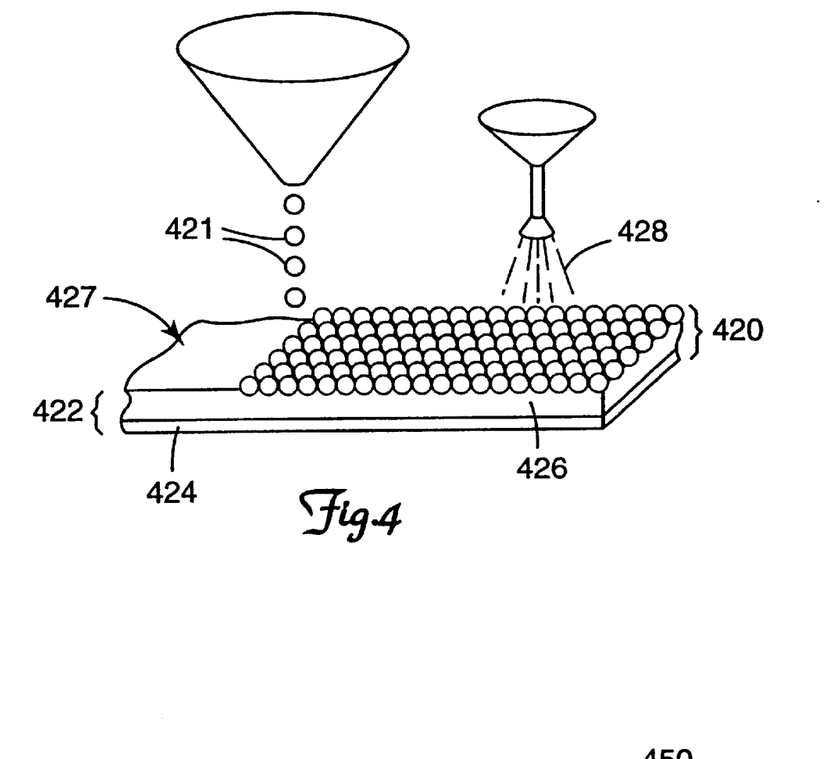
FIG. 4 illustrates a process of depositing an optical element layer 420 in a temporary carrier 422 to allow articles of the invention to be subsequently produced therefrom.

FIG. 4 depicts part of a preferred process for making a retroreflective article in which an optical element monolayer 420 containing microspheres 421 (which may be subsequently used as a substrate for preparing the retroreflective articles of the present invention) comprises a temporary carrier 422 having a first layer 424, which can be paper, and a second layer 426, which is preferably polyethylene. Microsphere layer 420 may be formed by cascading or otherwise depositing spheres 421 onto layer 426, which is heated to a temperature sufficient to soften it, and the microspheres 421 are then pressed into layer 426 to a depth about half their diameter by a pressing means such as a heated roll, not shown. The exposed portions of the embedded microspheres 421 are then coated with a specularly reflecting layer, such as vacuum deposited aluminum, shown as 428 in FIG. 4. This process may be used to form the optical element monolayer 420 that is coated with the binder layer materials as described in the Examples set forth below. Processes for making articles of the invention may include some of the steps outlined in U.S. Pat. No. 5,474,827. In other embodiments, as described in U.S. Pat. No. 4,763,985, the reflecting layer may comprise one or more dielectric layers or nacreous flakes. After the pre-binder layer materials are coated onto the monolayer 420 and the binder layer is formed thereon, the carrier 422 is stripped from the product (commonly referred to as a transfer article) to produce a retroreflective article of the invention.

The binder layer, e.g. 110 (FIG. 1), contains a first domain comprising a cured epoxy polymer and a second domain comprising polymer chains (e.g. polyether chains) crosslinked by silicone linkages. It is believed that the cross-linked polymer component forms a flexible matrix around relatively rigid epoxy domains. The crosslinked polymer domain preferably is the major domain, i.e., comprises more than 50 weight percent of the crosslinked polymer and epoxy domains.

An important aspect of the present invention is the discovery of an epoxy and a crosslinked polymer combination that can have sufficient flexibility to serve as a binder layer in a retroreflective article that is displayed on clothing and other articles of apparel. By "flexible" it is meant that the retroreflective article can be attached to clothing, footwear or other apparel without causing the article of apparel to become so stiff as to be uncomfortable to wear, or to undergo cracking or other damage caused by flexing during use, or to cause damage to the item of apparel by exerting stress on the item. Preferably, the cured binder material has an elongation before break of at least 400%, more preferably at least 500%, as measured by forming a pure layer of the binder material of an initial length, without heads or other retroreflective solid components, curing the layer, measuring the initial length, stretching the sample until it breaks and calculating the % elongation, which equals 100 times the length at breakage divided by the initial length.

Stiffness of fabrics can be measured either subjectively or by mechanical means. A subjective evaluation procedure is disclosed in "Fabric Hand: Subjective Evaluation Of," evaluation procedure 5, AATCC Technical Manual, published by the American Association of Textile Colorists and Chemists, vol. 67, 1992. Alternatively, a mechanical test of stiffness can be performed on the Shirley Stiffness Tester as described by J. E. Booth, Principles of Textile Testing, 3rd ed., Chemical Publishing Co., Inc., NY, N.Y., 1969, pp.283–286. Preferably, the combined binder layer and retroreflective layer have stiffness comparable to or less than the fabric layer or garment on which the retroreflective article is attached.

The binder layer preferably is made from a polymeric mixture that contains about 5 to 40 parts epoxy resin and about 60 to 95 parts of an alkoxysilane terminated organic polymer. Good results may be obtained by mixing about 10 to 20 parts epoxy and about 80–90 parts polymer that is alkoxysilane terminated, and still more preferably about 10 to 15 parts epoxy resin and about 85 to 90 parts alkoxysilane terminated polymer. It is contemplated, however, that in view of the teachings herein, persons of skill in this area may recognize that the present invention includes variations of the formulation that can be prepared without undue experimentation and result in a flexible adhesive layer, and such variations are within the scope of the invention.

A preferred epoxy resin suitable for use in the present invention is a Bisphenol A type epoxy such as EPON Resin 828 available from Shell Chemical, Houston, Tex., which is a Bisphenol A/epichlorohydrin derived resin having a viscosity of 110 to 150 poise at 25° C. and an epoxide equivalent weight (grams resin per gram equivalent epoxide) of about 190. Preferably, the epoxy resin is added at about 5 to about 40 parts.

The epoxy resin can be cured using epoxy curing agents known in the art. It is preferred that the epoxy resin and catalyst portion of the formulation be prepared separately from the alkoxysilane capped polymer portion of the system and combined just prior to use. It is therefore preferred that the epoxy curing agent allow sufficient pot life to permit the separately prepared resin mixtures to be mixed and used at a later time. The epoxy curing agents can be any of those known in the art and preferably is an amine. The amine curing agent can be, for example, triethylenetetramine, diethylaminopropylamine, etc. A preferred amine catalyst is 2,4,6-trisdimethylaminomethylphenol (DMP-30, available from Rohm & Haas, Philadelphia, Pa.). The epoxy curing agent is preferably added in about 6 to about 14, more preferably about 8 to about 12 percent by weight of the epoxy.

The silicone crosslinked polymer used in the binder layer may be a flexible polymer including but not limited to an elastomer. For the purposes of the invention, an elastomer is defined as having an ability to be stretched to at least twice its original length and to retract to approximately its original length when released. Illustrative examples of repeating units in the organic silicone crosslinked polymers include: olefins, esters, urethanes, ethers, and butadiene, isoprene, chloroprene, and the like. Preferably the organic polymer portion is a polyalkyloxy such as polyether, more preferably, polypropylene oxide.

The alkoxysilane caps of the polymer can have the general formula—$SiR^1{}_n(OR^2)_{3-n}$; where n is an integer between 0 and 2 and $R^1$ and $R^2$ are the same or different and comprise a hydrocarbon of about 1 to 6 carbons. Both ends of the polymer are terminated with a silicone-containing, crosslinkable, functional group. In a preferred embodiment, n is 1 and both $R^1$ and $R^2$ are methyl. A particularly preferred example of the alkoxysilane terminated organic polymer is Silmod™ SAT-200, which has a viscosity of about 260 poise at 23° C. SAT-200 resin was available from Union Carbide and is now available from Kaneka America Corporation, New York, N.Y.

The silicon-containing polymer is crosslinked through silicone (—Si—O—Si—) links between the polymeric chains, in a reaction that can be accelerated by water and an organometallic catalyst. Therefore, a small amount of water, preferably about 0.16% to about 0.48%, more preferably about 0.24% to about 0.40% by weight, based upon the weight of the silicon-containing polymer, is added.

Preferred catalysts for the polyalkyloxy polymers that are alkoxysilane terminated include organometallic compounds. The organometallic compounds may be organotin compounds such as dimethyltin dilaurate, dibutyltin dilaurate, dibutyltin dimercaptide, dimethyltin dithioglycolate, dioctyltin dithioglycolate, and other organometallic catalysts suitable for curing alkoxysilane linkage reactions. A preferred catalyst is Fomrez™ UL-11A, available from Witco Corp., Houston, Tex. The catalyst is preferably employed in the reaction mixture at about 0.5 to 3.5, more preferably about 1 to 2, and still more preferably 1.5 to 2.5 weight percent of the alkoxysilane terminated polymer.

Other additives, such as coupling agents and other adhesion promoters, may be incorporated into the binder resin. Preferably, the binder resin is prepared from two premixes, one premix containing the epoxy portion of the binder and one premix containing the alkoxysilane terminated polymer portion of the binder. The two premixes are mixed shortly before coating. Preferably, in order to delay curing of the two premixes until they are ready to be coated, water and organometallic catalyst, which are for curing the alkoxysilane terminated polymer, are incorporated into the epoxy premix, and a curing agent, such as an amine, which is for curing the epoxy, are incorporated into the alkoxysilane terminated polymer. The catalyst and curing agent are preferably such that the curing agent for one portion does not adversely affect the curing of the other portion. Additives such as adhesion promoters or coupling agents can be incorporated into either premix provided the additive does not cause premature premix curing. In preferred embodiments, the binder layer is essentially without filler or materials that reduce the binder layer's flexibility.

The adhesion promoter can be an aminosilane such as aminomethyltrimethoxysilane, aminopropyltriethoxysilane, etc. One preferred adhesion promoter is Silane A-1120 available from OSi Specialities, Danbury, Conn. The adhesion promoter is preferably added at about 0.2% to about 1.5%, more preferably about 0.5 to about 1.0% by weight, based upon the total weight of the alkoxysilane terminated polymer and the epoxy.

Additives may also include colorants (for example, pigments and dyes) and stabilizers (for example, thermal and hydrolytic stabilizers and antioxidants), flame retardants, flow modifiers (for example, surfactants), viscosity adjusters (for example, organic solvents), rheology modifiers (for example, thickeners), coalescing agents, plasticizers, tackifiers, and the like.

Generally, the binder layer contains from about 70 percent by weight up to 100 percent by weight of the epoxy polymer and the crosslinked silicon-containing polymer decried above, with the remainder being optional additives. The additives of course should not substantially degrade the abrasion resistance and launderability of the retroreflective articles or otherwise adversely affect its retroreflective performance.

The binder layer preferably has a thickness of about 50 to 250 mm (2 to 10 mils), more preferably about 75 to 200 mm (3 to 8 mils). A binder layer having a thickness outside these ranges may be used—however, if the binder layer is too thin, it may not provide sufficient support to the retroreflective elements and the elements may become dislodged.

Preferably, the binder is made by: mixing, at room temperature, the epoxy resin with a small amount of water and an organotin catalyst; separately mixing at room temperature, the alkoxysilane terminated polymer with an adhesion promoter and the amine catalyst; then mixing the two mixtures together and applying the binder composition to the specularly reflective layer of the retroreflective article. Preferably, the alkoxysilane terminated polymer portion and the epoxy portion are each mixed thoroughly before combining both to achieve adequate curing, as well as to attain a uniform coating mixture. After curing, the binder layer contains cured epoxy domain(s) and a crosslinked polymer domain which polymer is crosslinked through silicone linkages.

The optical elements that are used in the invention are capable of redirecting light so that, in conjunction with the reflective layer, incoming light can be retroreflected. The optical elements preferably are spherical transparent microspheres.

When transparent microspheres are used as the optical elements, the microspheres preferably are substantially spherical in shape to provide uniform and efficient retroreflection. The microspheres also preferably are substantially transparent to minimize light absorption by the microspheres and thereby optimize the amount of light that is retroreflected by an article of the invention. The microspheres typically are substantially colorless but may be colored to produce special effects. Transparent microspheres may be made from glass or synthetic resin which possess the required optical properties and physical characteristics needed for retroreflection. Glass microspheres typically are preferred because they can be harder and more durable than microspheres made from synthetic resins.

Microspheres used in the present invention preferably have an average diameter of about 30 to 200 micrometers ($\mu$m), more preferably 40 to 90 $\mu$m. Microspheres smaller than 30 $\mu$m may tend to provide lower levels of retroreflection because of diffraction effects; whereas, microspheres larger than 200 $\mu$m may tend to impart undesirably rough texture to the article or undesirably reduce the flexibility thereof Microspheres used in this invention preferably have a refractive index of about 1.7 to about 2.0.

Examples of specularly reflective metal arrangements include a coating of metal on the optical elements, a coating of metal on the binder layer underneath the optical elements, and a dispersion of metal flakes or a layer of metal (e.g., metal film) within the binder layer with at least a portion being functionally adjacent to the optical elements so that this portion will reflect light passing through the optical elements. The specularly reflecting layer can be, for example, a metal reflective layer. The term "metal reflective layer" is used herein to mean a layer comprising elemental metal which is capable of reflecting light, preferably specularly reflecting light. The metal may be a continuous coating produced by vacuum-deposition, vapor coating, chemical deposition, or electroless plating.

A variety of metals may be used to provide a specularly reflective metal layer. These include aluminum, silver, chromium, nickel, magnesium, and the like, in elemental form. Aluminum and silver are preferred metals for use in the reflective layer because they tend to provide good retroreflective brightness. It is to be understood that in the case of aluminum, some of the metal may be in the form of metal oxide or hydroxide, or a combination of oxide and hydroxide. Although the reflective color of a silver coating can be brighter than an aluminum coating, an aluminum layer normally is more preferred because it can provide better laundering durability when adhered to a glass optical element. The metal layer should be sufficiently thick to reflect incoming light, preferably about 50 to 150 nanometers thick.

Alternatively, a dielectric mirror may be used in place of a metal reflective layer. The dielectric mirror may be similar to known dielectric mirrors disclosed in U.S. Pat. Nos. 3,700,305 and 4,763,985 to Bingham. In using dielectric mirrors, the microspheres typically have a refractive index $n_2$ and have a layer of transparent material disposed thereon which has a refractive index $n_1$. The opposite face of the transparent material having refractive index n , is in contact with a material having a refractive index $n_3$. Both $n_2$ and $n_3$ have a refractive index of at least 0.1, and preferably at least 0.3, higher or lower than $n_1$. The transparent material is a layer typically having an optical thickness corresponding to odd numbered multiples, that is (1, 3, 5, 7, . . . ) of about one quarter wavelength of light in the wavelength range of about 380 to about 1000 nanometers. Thus, either $n_2 > n_1$ and $n_{3>n1}$, or, alternatively, $n_2 < n_1$ and $n_3 < n_1$, meaning that the materials on either side of the transparent material having refractive index n o are either both higher or both lower in refractive index than the material having refractive index $n_1$. When $n_1 > n_2$ and $n_1 < n_3$, $n_1$ is preferably in the range of about 1.7 to about 4.9, and $n_2$ and $n_3$ are preferably in the 1.2 to 1.7 range. Conversely, when $n_1 < n_2$ and $n < n_3$, $n_1$ is preferably in the 1.2 to 1.7 range, and $n_2$ and $n_3$ are preferably in the 1.7 to 4.9 range, provided that $(n_1 - n_2) \geq 0.1$, preferably $(n_1 - n_2) \geq 0.3$, and $(n_1 - n_3) \geq 0.1$, preferably $(n_1 - n_3) \geq 0.3$. The dielectric material preferably comprises a contiguous array of materials, at least one being in layer form, having an alternating sequence of refractive indices. In a preferred embodiment, the contiguous array has from two to seven layers, preferably three to five layers, adjacent to the spherical lens element. Desirably, all are light transparent materials and are clear or essentially colorless to minimize light absorption and maximize display of the colored binder layer. A dielectric mirror can provide very good retroreflectivity, although, it typically is not as efficient a reflector as a reflective metal layer.

Among the many compounds that may be used in providing transparent materials within the desired refractive index range are: high index materials such as $CeO_2$, CsI, GaAs, Ge, InAs, InP, InSb, $ZrO_2$, $Bi_2O_3$, ZnSe, ZnS, $WO_3$, PbS, PbSe, PbTe, RbI, Si, $Ta_2O_5$, Te, $TiO_2$; low index materials such as $Al_2O_3$, $AlF_3$, $CaF_2$, $CeF_3$, LiF, $MgF_2$, NaCl, $Na_3AlF_6$, $ThOF_2$, elastomeric copolymers of perfluoropropylene and vinylidene fluoride having refractive indices<<1.38, and other like materials. Other suitable materials are reported in Thin Film Phenomena, K. L. Chopra, page 750, McGraw-Hill Book Company, New York, (1969). Preferred succeeding layers contain cryolite ($Na_3AlF_6$) and zinc sulfide.

Reflective flake materials may also be used as the reflective layer. Suitable flake materials include mica which has been coated with titanium dioxide, bismuth oxychloride, and natural pearl essence.

The inventive retroreflective article may be applied to substrates using mechanical methods such as sewing. In some applications, however, it is desired to secure the article to the substrate using an adhesive layer with or without a fabric layer. The adhesive layer may be a pressure-sensitive adhesive, a heat-activatable adhesive, or an ultraviolet-radiation-activated adhesive. The substrate bearing the retroreflective article can be located on the outer surface of an article of clothing, enabling the retroreflective article to be displayed when the clothing is worn in its normal orientation on a person. The substrate may be, for example, a woven, knit, or nonwoven fabric containing cotton, wool, flax, nylon, olefin, polyester, cellulose, rayon, urethane, vinyl, acrylic, rubber, spandex, and the like, or it could be made from leather or paper.

Figure 5:
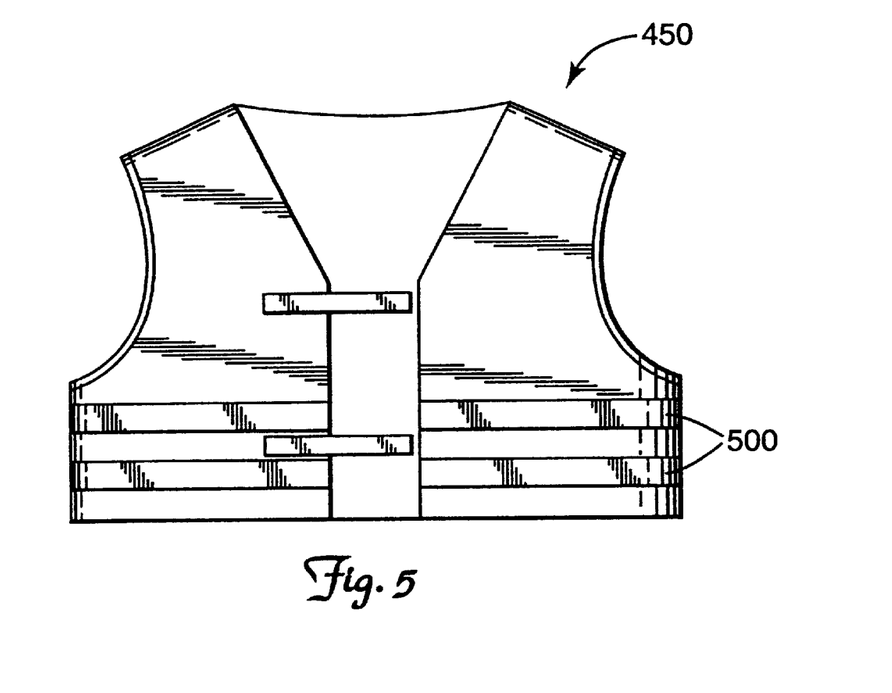
FIG. 5 illustrates an article of clothing 450 displaying a retroreflective article 500 in accordance with the present invention.

FIG. 5 illustrates a safety vest 40 displaying a retroreflective article 42 in the form of an elongated sheeting or strip. Safety vests often are worn by road construction workers to improve their visibility to oncoming motorists. These kinds of vests frequently come into contact with dirt and grime and abrasive surfaces and particles, and therefore the retroreflective article must be able to withstand laundering conditions and abrasion so that the vest can be reused a number of times. Although a safety vest 450 has been chosen for illustration, the article of clothing of the invention may come in a variety of forms. As the term is used herein, "article of clothing" means a launderable item of wearing apparel sized and configured to be worn or carried by a person. Other examples of articles of clothing that may display retroreflective articles of the invention include shirts, sweaters, jackets (e.g. fireman's jackets), coats, pants, shoes, socks, gloves, belts, hats, suits, one-piece body garments, bags, backpacks, et cetera. Because the inventive retroreflective articles are capable of displaying good abrasion resistance, the articles may be particularly suitable for use on the outer surface of a shoe such as a running shoe.

EXAMPLES

Advantages, objects, and other details of the invention are further illustrated in the Examples set forth below. It is to be understood, however, that while the examples serve this purpose, the particular ingredients and amounts used and other conditions recited in the Examples are not to be construed in a manner that would unduly limit the scope of this invention. The Examples selected for disclosure in here are merely illustrative of how to make various embodiments of the invention and how the embodiments generally perform.

Retroreflective Brightness Test

The coefficient of retroreflection, $R_A$, was measured in accordance with standardized test ASTM E 810-94. The test results are expressed below as the percentage of initial retroreflective brightness. The entrance angle used in ASTM E 810-94 was –4 degrees, and the observation angle was 0.2 degrees. Further reference to "ASTM E 810-94" means ASTM E 810-94 where the entrance and observation angles are specified in the previous sentence.

Abrasion Testing

Abrasion was applied by a Taber abrasion machine used according to Federal Test Method Standard 191A, Method 5306. Retroreflective article samples made in the following examples were attached, by means of adhesive tape having adhesive on both sides, to a rigid metal plate adapted to be used as a sample holder in the Taber abrasion machine. Before running the abrasion test, initial retroreflective brightness measurements were made at several points on the sample to be abraded by the Taber abrasion machine; all the readings were averaged to produce the initial retroreflective brightness reading. The sample was then subjected to abrasion, as prescribed in Test Method 5306, for 100 abrasion cycles, removed from the machine, and tested for retroreflective brightness at several test points on the sample which were loaded in the abraded portion of the sample, in the same manner as was done for the initial brightness reading. Brightness retention after abrasion was reported as a percentage of the initial brightness, before abrasion testing of the sample.

Home Laundering

The home laundering test was done using a Maytag LS7804 automatic washing machine, using setting 10, which is the "Regular" fabric setting, the "Large Load" setting and the "Hot/Cold" temperature setting using an inlet water temperature of about 43° C., with 40 grams of a standard detergent (Tide™) and 1.8 kilograms of cotton fabric ballast, per wash cycle. After every fifth wash/rinse cycle, each sample was tumble dried in a Maytag Model LS7804 dryer, set at the "Regular" fabric setting, using an air temperature of about 60° C., until the total load was dried, after which the load was tumbled, with the heat turned off, for a 5–10 minute cooling period. The samples were then tested for retroreflective brightness using ASTM E810-94. Relative brightness results were recorded as a percentage of initial retroreflective brightness, measured as a function of cumulative number of wash cycles, with the final brightness retention being the relative retroreflective brightness after 100 wash cycles (and twenty drier cycles). For the purposes of this description, the above test defines "typical washing conditions."

Sample Preparation

The binder materials of the present invention were prepared by first preparing two separate premixes, hereinafter called the epoxy premix and the polyether premix, and combining them in predetermined proportions prior to coating them onto the optical elements. Several formulations were prepared, as shown in Table I. The different formulations were obtained by using a constant amount of SILMOD SAT-200 and its corresponding catalyst, FOMREZ UL-11A, and water and using different amounts of EPON 828 and its corresponding catalyst, DMP-30. The polyether premix and epoxy premix were manually mixed together at room temperature to form the bond resin just prior to coating. SAT-200 and EPON 828 were used as provided without addition of solvents.

TABLE I

| | EPOXY PREMIX AND POLYETHER CATALYST | | | | POLYETHER PREMIX, EPOXY CATALYST, AND ADDITIVES | | | |
|---|---|---|---|---|---|---|---|---|
| EXAMPLE | EPON 828,[1] grams | EPON 828,[1] parts | DEIONIZED WATER, grams | FOMREZ UL-11A[2] grams | SILMOD SAT-200,[3] grams | SILMOD SAT-200,[3] parts | SILANE A-1120,[4] grams | DMP-30[5] grams |
| 1 | 2.78 | 10 | 0.08 | 0.5 | 25.0 | 90 | 0.25 | 0.28 |
| 2 | 4.41 | 15 | 0.08 | 0.5 | 25.0 | 85 | 0.25 | 0.44 |
| 3 | 6.25 | 20 | 0.08 | 0.5 | 25.0 | 80 | 0.25 | 0.63 |
| 4 | 8.33 | 25 | 0.08 | 0.5 | 25.0 | 75 | 0.25 | 0.83 |

[1]EPON Resin 828 difunctional bisphenol A/epichlorohydrin-derived liquid epoxy resin, available from Shell Chemical Company, Houston, TX, and described in Shell Technical Bulletin SC:235-91.828
[2]FOMREZ UL-11 A tin catalyst, available from Witco Corporation, Greenwich, CT.
[3]SILMOD SAT-200 high molecular weight liquid polyether terminated with reactive alkoxysilane functional groups, formerly available from Union Carbide, but now distributed by Kaneka America Corporation, New York, NY.
[4]SILANE A-1120 adhesion promoter, available from OSi Specialties, Danbury CT.
[5]DMP-30 amine catalyst available from Rohm & Haas, Philadelphia, PA The final step in preparing the coating resin was to mix the epoxy premix with the polyether premix to form the bond resin to be coated onto the retroreflective element monolayer, which in this case was a glass monolayer with glass having a diameter in the range of 40–90 mm and a vapor-coated aluminum layer prepared as described above in regard to FIG. 4.

The binder resin was coated onto the aluminum surface of the retroreflective element layer using a notch bar coater, which comprised a planar surface having a notched bar crossing set at a predetermined height such that when the retroreflective element monolayer substrate was dragged beneath the bar, the clearance between the monolayer and the bottom of the bar was equal to the desired coating thickness. Coating was performed by setting the notch bar at a clearance above the retroreflective elements substrate of 102 mm (0.004 inches), and partially curing the resultant coating by allowing it to stand at room temperature for 9 minutes. A layer of polyester fabric was then laminated to the bond coating, and the complete assemblage was placed in an oven at 66° C. (150° F.) for 5 minutes, followed by 10 minutes at 127° C. (260° F.). The polyethylene carrier was then removed to expose the glass beads.

The proportions of epoxy premix and polyether premix used in the examples, and brightness retention for each example, were as follows:

TABLE II

| EXAMPLE | EPON (parts) | SAT-200 (parts) | Brightness Retention (Abrasion) | Brightness Retention (100 Wash Cycles) |
|---|---|---|---|---|
| 1 | 10 | 90 | 62.8% | 52.7% |
| 2 | 15 | 85 | 62.5% | 53.8% |
| 3 | 20 | 80 | 70.8% | 11.0% |
| 4 | 25 | 75 | 52.5% | 12.3% |

As shown in Table II, the inventive samples demonstrate good brightness retention after being subject to abrasion and launderability. As seen in Examples 3 and 4, however, brightness retention after home laundering drops significantly at higher epoxy levels.

All references mentioned above are incorporated herein in their entirety as if reproduced in fill.

The invention can have various modifications and alterations, without departing from the spirit and scope thereof. Accordingly, it is to be understood that this invention is not to be limited to the above examples but is to be controlled by the limitations set forth in the following claims and any equivalents thereof.

What is claimed is:

1. A method of making a retroreflective article, which method comprise the steps of:
    applying a pre-binder composition onto a retroreflective layer where the pre-binder composition comprises about 5 to about 40 parts of an epoxy resin and about 60 to about 95 parts of an alkoxysilane terminated polymer; and then
    curing the pre-binder composition to form a binder layer that is adhered to the retroreflective layer.

2. The method of claim 1, wherein the binder resin is prepared from a mixture comprising about 10 to about 20 parts epoxy resin and about 80 to about 90 parts alkoxysilane terminated polymer.

3. The method of claim 1, wherein the pre-binder composition is prepared by mixing:
    a premix comprising about 10 to about 20 parts epoxy resin, about 0.16% to about 0.48%, water by weight, based upon the weight of the alkoxysilane terminated polymer, and about 0.5 to about 3.5 weight percent organometallic catalyst relative to the weight of the alkoxysilane terminated polymer; with
    a premix comprising about 80 to about 90 parts alkoxysilane terminated polymer, about 0.2% to about 1.5% adhesion promoter, and about 6 to about 14% epoxy ring agent by weight of the epoxy;
    wherein the alkoxysilane terminated polymer comprises a polyether comprising end groups of the formula $SiR^1_n(OR^2)_{3-n}$, wherein $R^1$ and $R^2$ are the same or different and are hydrocarbons of about 1 to 6 carbons, and n is an integer of 0 to 2.

4. The method of claim 1, wherein the retroreflective layer includes optical elements and a reflective layer.

5. The method of claim 4, wherein the optical elements comprise glass microspheres, and the reflective layer comprises a layer of aluminum metal.

6. The method of claim 1, further comprising securing a fabric layer to the binder layer such that the binder layer is disposed between the retroreflective layer and the fabric layer.

7. The method of claim 1, further comprising securing the retroreflective article to the outer surface of an article of clothing.

8. The method of claim 7, wherein the article of clothing is a shoe.

* * * * *

UNITED STATES PATENT AND TRADEMARK OFFICE
CERTIFICATE OF CORRECTION

PATENT NO.: 6,159,537

DATED: December 12, 2000

INVENTOR(S): Michael D. Crandall                     Page 1 of 2

It is certified that error appears in the above-identified patent and that said Letters Patent is hereby corrected as shown below:

Cover Page, under References Cited, U.S. Patent Documents, please add the following:
--4,763,985   8/16/88   Bingham
  5,283,101   2/1/94    Li
  5,338,595   8/16/94   Li
  5,645,938   7/8/97    Crandall--

Cover Page, under References Cited, Foreign Patent Documents, please add the following:
--0 620 255 A1   10/19/94   European Pat. Off--

Cover Page, under References Cited, after Foreign Patent Documents, please add the following:
--Other Publications
Shell Chemical Company Technical Bulletin for EPON® Resin 828 (SC:235-91.828) January 1991
Union Carbide product literature for SILMOD™ Silicon-Modified Polyether SAT-30 and SAT-200 For Adhesive Applications (SC-1755A) July 1991
Kaneka America Corporation product literature for New Silyl Terminated Polyether KANEKA MS POLYMER® and KANEKA SILYL™--

In the Abstract:
line 1, after "article," please insert --which method comprises the steps of:-- and delete "includes"
lines 7-8, delete the sentence "The method is useful for...clothing."

Col. 1, line 40, delete "layer, and...source."

Col. 2, line 15 "propyulene" should read as --propylene--

Col. 2, line 52, delete "TM" after "SILMOD"

Col. 2, line 58, "Silmod™" should read as --SILMOD--

UNITED STATES PATENT AND TRADEMARK OFFICE
CERTIFICATE OF CORRECTION

PATENT NO.: 6,159,537

DATED: December 12, 2000

INVENTOR(S): Michael D. Crandall    Page 2 of 2

It is certified that error appears in the above-identified patent and that said Letters Patent is hereby corrected as shown below:

Col. 5, line 8, "heads" should read as --beads--

Col. 6, line 9, "$SiR^1n^1(OR^2)_{3-n}$" should read as --$SiR^1n(OR^2)_{3-n}$--

Col. 16, line 16, "Silmod™" should read as --SILMOD--

Col. 8, line 34, "n" should read as --$n_1$--

Col. 8, line 35, delete the comma before "is"

Col. 8, line 42, "$n_{3>n1}$" should read as --$n_3>n_1$--

Col. 8, line 44, "n" should read as --$n_1$--

Col. 8, line 45, delete the "o" before "are"

Col. 9, line 6, "<<1.38" should read as -->>1.38--

Col. 11, line 63, "fill" should read as --fall--

Col. 12, line 47, "ring" should read as --curing--

Signed and Sealed this

First Day of May, 2001

NICHOLAS P. GODICI

*Attest:*

*Attesting Officer*    *Acting Director of the United States Patent and Trademark Office*